(12) United States Patent
Baker et al.

(10) Patent No.: US 9,919,750 B2
(45) Date of Patent: Mar. 20, 2018

(54) SIDE SKIRT SYSTEM FOR REDUCING DRAG

(71) Applicant: Wabash National, L.P., Lafayette, IN (US)

(72) Inventors: Leonard W. Baker, Lafayette, IN (US); M. Scott Stinson, Fowler, IN (US); Michael J. Courtney, Dayton, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 14/457,222

(22) Filed: Aug. 12, 2014

(65) Prior Publication Data
US 2017/0174271 A1    Jun. 22, 2017

Related U.S. Application Data

(60) Provisional application No. 61/866,220, filed on Aug. 15, 2013.

(51) Int. Cl.
*B62D 35/02* (2006.01)
*B62D 35/00* (2006.01)

(52) U.S. Cl.
CPC ........... *B62D 35/02* (2013.01); *B62D 35/001* (2013.01); *B62D 35/008* (2013.01)

(58) Field of Classification Search
CPC ..................................................... B62D 35/02
USPC ...................................................... 296/180.4
See application file for complete search history.

(56) References Cited

U.S. PATENT DOCUMENTS

| | | | |
|---|---|---|---|
| 357,800 A | 2/1887 | Wescott |
| 495,801 A | 4/1893 | Henthorne |
| 564,027 A | 7/1896 | Pratt |
| 824,541 A | 6/1906 | Hager et al. |
| 1,127,241 A | 2/1915 | Hawksworth |
| 2,318,863 A | 5/1943 | Jabelmann |
| 2,737,411 A | 3/1956 | Potter |
| 2,962,295 A | 11/1960 | Tenenbaum |
| 3,126,209 A | 3/1964 | Jewell et al. |

(Continued)

FOREIGN PATENT DOCUMENTS

| | | |
|---|---|---|
| CA | 2651688 A1 | 7/2009 |
| CA | 2715304 A1 | 3/2011 |

(Continued)

OTHER PUBLICATIONS

Office action in U.S. Appl. No. 13/847,111 dated Nov. 5, 2013 (6 pages).

(Continued)

*Primary Examiner* — Jason S Morrow
(74) *Attorney, Agent, or Firm* — Quarles & Brady LLP

(57) ABSTRACT

A trailer having a storage container, a landing gear assembly coupled to the storage container, and a rear wheel assembly coupled to the storage container includes a side skirt system for reducing drag on the trailer. The side skirt system includes a side skirt wall configured to be coupled to one side of the trailer to extend below one side wall of the trailer at least partially along a length of the trailer. A length of the side skirt wall along a top edge of the side skirt wall is approximately 48%-80% of a distance between the landing gear and forward-most position of the rear wheel assembly.

16 Claims, 13 Drawing Sheets

(56) References Cited

U.S. PATENT DOCUMENTS

| | | |
|---|---|---|
| 3,256,655 A | 6/1966 | Teter |
| 3,401,953 A | 9/1968 | Prohl et al. |
| 3,483,939 A | 12/1969 | Maddock et al. |
| 3,608,928 A | 9/1971 | Hooker |
| 3,711,146 A | 1/1973 | Madzsar et al. |
| 3,852,965 A | 12/1974 | Rudd |
| 3,859,797 A | 1/1975 | Ayers |
| 4,006,932 A | 2/1977 | McDonald |
| 4,045,962 A | 9/1977 | Preus |
| 4,060,268 A | 11/1977 | Page, Jr. |
| 4,103,918 A | 8/1978 | Salden |
| 4,104,884 A | 8/1978 | Preus |
| 4,142,755 A | 3/1979 | Keedy |
| 4,190,381 A | 2/1980 | Knaus et al. |
| 4,236,745 A | 12/1980 | Davis |
| 4,262,961 A | 4/1981 | Schmidt |
| 4,282,946 A | 8/1981 | MacGuire |
| 4,352,502 A | 10/1982 | Leonard |
| 4,421,333 A | 12/1983 | Van Dyke |
| 4,611,847 A | 9/1986 | Sullivan |
| 4,688,824 A | 8/1987 | Herring |
| 4,746,160 A | 5/1988 | Wiesemeyer |
| 4,943,204 A | 7/1990 | Ehrlich |
| 5,058,945 A | 10/1991 | Elliott, Sr. et al. |
| 5,094,744 A | 3/1992 | Scovell |
| 5,152,228 A | 10/1992 | Donkin |
| 5,280,990 A | 1/1994 | Rinard |
| D354,726 S | 1/1995 | Fitzgerald et al. |
| 5,489,137 A | 2/1996 | Herrmeyer |
| 5,607,200 A | 3/1997 | Smidler |
| 5,673,953 A | 10/1997 | Spease |
| 5,716,071 A | 2/1998 | Stanley et al. |
| 5,823,610 A | 10/1998 | Ryan |
| 5,921,617 A | 7/1999 | Loewen et al. |
| 6,079,769 A | 6/2000 | Fannin et al. |
| 6,092,861 A | 7/2000 | Whelan |
| 6,109,675 A | 8/2000 | Sumrall |
| 6,116,667 A | 9/2000 | Torcomian |
| 6,257,654 B1 | 7/2001 | Boivin et al. |
| 6,286,894 B1 | 9/2001 | Kingham |
| 6,309,010 B1 | 10/2001 | Whitten |
| 6,409,252 B1 | 6/2002 | Andrus |
| 6,443,492 B1 | 9/2002 | Barr et al. |
| 6,467,833 B1 | 10/2002 | Travers |
| 6,485,087 B1 | 11/2002 | Roberge et al. |
| 6,595,578 B1 | 7/2003 | Calsoyds et al. |
| 6,626,475 B2 | 9/2003 | Schroeder |
| 6,644,720 B2 | 11/2003 | Long et al. |
| 6,666,498 B1 | 12/2003 | Whitten |
| 6,799,791 B2 | 10/2004 | Reiman et al. |
| 6,837,536 B1 | 1/2005 | Schwartz |
| 6,893,079 B1 | 5/2005 | Johnson et al. |
| 6,915,611 B2 | 7/2005 | Reiman et al. |
| 6,959,958 B2 | 11/2005 | Basford |
| 6,974,166 B2 | 12/2005 | Ledford et al. |
| 6,974,178 B2 | 12/2005 | Ortega et al. |
| 7,059,819 B2 | 6/2006 | Brackmann et al. |
| 7,086,674 B2 | 8/2006 | Goetz |
| 7,093,889 B2 | 8/2006 | Graham |
| 7,134,820 B2 | 11/2006 | Ehrlich |
| 7,147,270 B1 | 12/2006 | Andrus et al. |
| 7,163,258 B2 | 1/2007 | Dyer, II et al. |
| 7,188,875 B2 | 3/2007 | Norelius |
| 7,347,154 B2 | 3/2008 | Evans |
| 7,404,592 B2 | 7/2008 | Reiman et al. |
| 7,407,204 B2 | 8/2008 | Eriksson et al. |
| 7,431,381 B2 | 10/2008 | Wood |
| 7,497,502 B2 | 3/2009 | Wood |
| 7,537,270 B2 | 5/2009 | O'Grady |
| 7,578,541 B2 | 8/2009 | Layfield et al. |
| 7,604,284 B2 | 10/2009 | Reiman et al. |
| 7,665,716 B2 | 2/2010 | Reast |
| 7,686,385 B2 | 3/2010 | Dolan et al. |
| 7,740,303 B2 | 6/2010 | Wood |
| 7,748,772 B2 | 7/2010 | Boivin et al. |
| 7,780,224 B2 | 8/2010 | Roush |
| 7,837,254 B2 | 11/2010 | Reiman et al. |
| 7,877,120 B2 | 2/2011 | Boivin et al. |
| 7,938,475 B2 | 5/2011 | Boivin et al. |
| 7,942,466 B2 | 5/2011 | Reiman et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,721 B1 | 5/2011 | Peterson |
| 7,967,349 B2 | 6/2011 | Puppini et al. |
| 8,162,384 B2 | 4/2012 | Giromini et al. |
| 8,177,286 B2 | 5/2012 | Brown et al. |
| 8,191,956 B1 | 6/2012 | Dixon et al. |
| 8,210,599 B2 | 7/2012 | Butler |
| 8,303,025 B2 | 11/2012 | Senatro |
| 8,376,450 B1 * | 2/2013 | Long .................. B62D 35/001 |
| | | 296/180.4 |
| 8,382,194 B2 | 2/2013 | Wood |
| 8,398,150 B2 | 3/2013 | Brown et al. |
| 8,408,570 B2 | 4/2013 | Heppel et al. |
| 8,496,286 B1 | 7/2013 | Katz et al. |
| 8,579,359 B2 | 11/2013 | Brown et al. |
| 8,616,616 B2 | 12/2013 | Van Raemdonck |
| 8,783,758 B2 | 7/2014 | Baker |
| 8,801,078 B2 | 8/2014 | Brown et al. |
| 8,857,893 B2 | 10/2014 | Reiman et al. |
| 8,899,660 B1 | 12/2014 | Praskovskaya et al. |
| 8,973,971 B1 | 3/2015 | Kronemeyer |
| 8,973,973 B2 | 3/2015 | Kronemeyer |
| 8,979,172 B2 | 3/2015 | Reiman et al. |
| 8,985,677 B2 | 3/2015 | Wiegel |
| 9,004,575 B2 | 4/2015 | Grandominico et al. |
| 9,045,176 B2 | 6/2015 | Henderson, II |
| 9,139,241 B1 | 9/2015 | Smith |
| 9,199,673 B2 | 12/2015 | Baker |
| 9,199,676 B2 | 12/2015 | Brown et al. |
| 9,211,919 B2 | 12/2015 | Senatro |
| 9,296,433 B2 | 3/2016 | Roush |
| 9,340,240 B2 * | 5/2016 | Clark .................. B62D 35/001 |
| 9,308,949 B1 | 9/2016 | Mihelic et al. |
| 9,669,883 B2 * | 6/2017 | Bassily ............... B62D 35/001 |
| 2003/0178611 A1 | 9/2003 | Anderson |
| 2005/0040637 A1 | 2/2005 | Wood |
| 2005/0067204 A1 | 3/2005 | Rijsbergen et al. |
| 2005/0115776 A1 | 6/2005 | Doerflinger et al. |
| 2005/0161976 A1 | 7/2005 | Ortega et al. |
| 2006/0152038 A1 | 7/2006 | Graham |
| 2006/0182580 A1 | 8/2006 | Peterson |
| 2007/0114757 A1 | 5/2007 | Vickroy |
| 2007/0120397 A1 | 5/2007 | Layfield et al. |
| 2007/0176466 A1 | 8/2007 | Dolan et al. |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0116702 A1 | 5/2008 | Enz et al. |
| 2009/0189414 A1 | 7/2009 | Boivin et al. |
| 2009/0212595 A1 | 8/2009 | Heppel et al. |
| 2009/0212596 A1 | 8/2009 | Reiman et al. |
| 2009/0218848 A1 | 9/2009 | Boivin et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0231000 A1 | 9/2010 | Andrus et al. |
| 2010/0264690 A1 | 10/2010 | Brown et al. |
| 2010/0264691 A1 | 10/2010 | Giromini et al. |
| 2011/0025092 A1 | 2/2011 | Reiman et al. |
| 2011/0062749 A1 | 3/2011 | Graham et al. |
| 2011/0148142 A1 | 6/2011 | Kint |
| 2011/0175396 A1 | 7/2011 | Boivin et al. |
| 2011/0204677 A1 | 8/2011 | Wood et al. |
| 2011/0285167 A1 | 11/2011 | Butler |
| 2012/0074728 A1 * | 3/2012 | Senatro .................. B62D 35/02 |
| | | 296/180.4 |
| 2012/0091754 A1 | 4/2012 | Lee et al. |
| 2012/0169086 A1 | 5/2012 | Giromini et al. |

(56) References Cited

U.S. PATENT DOCUMENTS

| | | | |
|---|---|---|---|
| 2012/0200113 A1 | 8/2012 | Brown et al. | |
| 2012/0235441 A1 | 9/2012 | Dayton | |
| 2012/0319428 A1 | 12/2012 | Wood | |
| 2013/0119701 A1 | 5/2013 | Dayton | |
| 2013/0181477 A1 | 7/2013 | Reiman et al. | |
| 2013/0270857 A1 | 10/2013 | Brown et al. | |
| 2013/0285411 A1 | 10/2013 | Layfield et al. | |
| 2014/0035318 A1 | 2/2014 | Brown et al. | |
| 2014/0110968 A1* | 4/2014 | Henderson | B62D 35/001 296/180.4 |
| 2014/0252799 A1 | 9/2014 | Smith | |
| 2014/0333089 A1 | 11/2014 | Brown et al. | |
| 2014/0159419 A1 | 12/2014 | Baker | |
| 2015/0175221 A1* | 6/2015 | Popa | B62D 35/004 296/180.4 |
| 2015/0259014 A1 | 9/2015 | Baker | |
| 2016/0068202 A1* | 3/2016 | Senatro | B62D 35/001 296/180.4 |
| 2016/0096558 A1* | 4/2016 | Bassily | B62D 35/02 296/180.4 |
| 2016/0121940 A1 | 5/2016 | Courtney | |
| 2016/0152285 A1* | 6/2016 | Wiegel | B62D 35/001 296/180.4 |
| 2016/0244108 A1 | 8/2016 | Tsuruta et al. | |
| 2017/0015369 A1* | 1/2017 | Senatro | B62D 35/001 |

FOREIGN PATENT DOCUMENTS

| | | | |
|---|---|---|---|
| CA | 2795076 A1 * | 5/2013 | |
| CA | 2810007 | 9/2013 | |
| CA | 2812316 A1 | 10/2013 | |
| CA | 2860351 A1 | 2/2015 | |
| CA | 2905596 A1 | 4/2016 | |
| EP | 0 738 621 A1 | 10/1996 | |
| EP | 0 857 620 A1 | 8/1998 | |
| JP | 2007223359 A | 9/2007 | |
| KR | 20110059021 | 6/2011 | |
| NL | 1034363 C2 | 2/2009 | |
| WO | 9748590 A1 | 12/1997 | |
| WO | 03 093066 A1 | 11/2003 | |

OTHER PUBLICATIONS

Office action in U.S. Appl. No. 14/644,508 dated Nov. 10, 2015 (16 pages).
Office action in U.S. Appl. No. 13/413,998 dated Nov. 2, 2012 (9 pages).
AeroFlex Fairing™ product info page (1 page), Jul. 7, 2010.
AeroFlex Belly Flaring™ product info page (2 pages), Jul. 7, 2010.
AeroFlex Low Rider Belly Fairing product info page (1 page), Jul. 7, 2010.
AeroFlex Freight Wing Chassis Belly Fairing product info page (1 page), Jul. 7, 2010.
Trailer Fairings from http://www.laydoncomp.cm/trailer-skirts.php (3 pages), Jul. 7, 2010.
Trailerskirt™ Assembly Instructions, Jun. 12, 2009 REV. 8.0 supersedes all other versions, LCL-ENG-045, (7 pages).
"MFS Skirt, Maximum Flex Skirt", Transtech Composite, (2 pages, updated material.
Side Skirt Fairing Overview: Aeroefficient-Aerodynamic Solution for the Trucking Industry, 2010 Aeroefficient (12 pages).
Truck Fuel Savings, Aerodynamic Fairing, Aerodynamic Parts, Truck Industry "WINDYNE", (2 pages), Jul. 7, 2010.
Laydon Composites, LTD. website Trailer Skirt Catalog as existed on Feb. 7, 2009, accessed via the Internet. Archive WayBack Machine on Oct. 3, 2011, found at http://web.archive.org/web/20090207195226/http://www.laydoncomp.com/trailer-skirts.php.
2009 Product Catalog for Takler Srl (31 pages).
The International Search Report and the Written and the Written Opinion of the International Searching Authority for related International Application No. PCT/US2010/031173, dated Jun. 14, 2010 (13 pages).
Strehl Trailer Blade Brochure, "Trailer Blade™ Model 715 Advanced Aerodynamic Trailer Skirt", (5 pages), 2009-2010.
Utility Brochure, "Innovative Side Skirt Designs From Utility", (2 pages), 2010.
Office Action in U.S. Appl. No. 12/760,798 dated Oct. 13, 2001 (12 pages).
Office Action in U.S. Appl. No. 13/448,931 dated Jun. 29, 2012 (12 pages).
Dec. 12, 2011 letter from Albert L. Underhill Law Office, P.L.L.C. to Carli E. Stewart, Chief Patent Counsel, Wabash National, L.P. (2 pages).
Office action in U.S. Appl. No. 13/413,998 dated Jul. 10, 2012 (9 pages).
Office action in U.S. Appl. No. 13/741,639 dated Apr. 5, 2013 (11 pages).
Office action in U.S. Appl. No. 14/049,851 dated Dec. 31, 2013 (11 pages).
Office action in U.S. Appl. No. 14/100,071 dated Mar. 26, 2015 (21 pages).
Nu-Line® Introducing Nu-Line Aerodynamic Trailer Skirts brochure NLTS-0314 (2 pages).
Office action in U.S. Appl. No. 14/923,610 dated Aug. 31, 2016 (7 pages).
Office action in U.S. Appl. No. 14/923,610 dated Dec. 13, 2016 (7 pages).
Office Action issued from IMPI for Mexican Patent Application No. MX/a/2014/009848, dated Jul. 31, 2017, pp. 1-4.

* cited by examiner

SIDE SKIRT SYSTEM FOR REDUCING DRAG

This application claims priority under 35 U.S.C. § 119(e) to U.S. Provisional Patent Application Ser. No. 61/866,220 filed Aug. 15, 2013 entitled SHORTENED SIDE SKIRT SYSTEM, the entirety of which is hereby incorporated by reference herein.

FIELD OF THE INVENTION

The present invention relates generally to semi-trailers, such as van-type trailers, for example. In particular, the present invention relates to an aerodynamic side skirt system for reducing drag on such a trailer.

BACKGROUND OF THE INVENTION

To reduce wind flow resistance and drag on a trailer, truck, semitrailer, or other vehicle, side skirts have been used which extend downwardly from a bottom of the trailer and/or chassis toward the roadway to partially enclose the floor assembly and undercarriage.

Air flow passing under a ground vehicle imparts a drag force to the vehicle when it impinges on and flows around the vehicle undercarriage components attached to or a part of the underside of a vehicle. Side skirt systems are designed to prevent or control the flow of air from entering the undercarriage region from the side of the ground vehicle, such as a trailer of a tractor-trailer truck system, for example. Such reduction on the drag of the ground vehicle may operate to conserve fossil fuels as well as other sources of vehicle drive power for hybrid vehicles, battery-operated vehicles, and alternative fuel-based vehicles, for example.

One example of a typical side skirt system is shown in U.S. Pat. No. 8,177,286, the entirety of which is expressly incorporated by reference herein. This particular skirt system is approximately 285 inches long and 32 inches tall and is configured to span most of the distance between the landing gear of a trailer and the rear wheel assembly of a trailer in order to leave a very small gap, or space, between the landing gear and the front end of the skirt system and between the rear tires of the rear wheel assembly and the rear end of the skirt system. As noted above, conventional understanding of the operation of the skirt systems is that each operates to prevent the flow of air from entering the undercarriage region of the trailer via the side of the trailer when the trailer is in transit traveling down a highway, for example. Thus, many prior art side skirt systems were designed to span generally the entire length between the rear tires and the landing gear in order to close the space below the trailer side wall between the landing gear and the rear tires in order to prevent as much air as possible from flowing under the trailer as the trailer travels down the highway.

SUMMARY

The present invention may comprise one or more of the features recited in the attached claims, and/or one or more of the following features and combinations thereof.

According to one aspect of the present disclosure, trailer having a storage container, a landing gear assembly coupled to the storage container, and a rear wheel assembly coupled to the storage container includes a side skirt system for reducing drag on the trailer. The side skirt system includes a side skirt wall configured to be coupled to one side of the trailer to extend below one side wall of the trailer at least partially along a length of the trailer. Illustratively, a length of the side skirt wall along a top edge of the side skirt wall is approximately 48%-80% of a distance between the landing gear and forward-most surface of a forward wheel of the rear wheel assembly when the rear wheel assembly is in a forward-most position on the trailer.

In one illustrative embodiment, a distance between a rear edge of the side skirt wall and the forward-most position of the wheels of the rear wheel assembly may be between approximately 54 and 102 inches.

In another illustrative embodiment, wherein a distance between a leg of the landing gear assembly and a top, front edge of the side skirt wall may be between approximately 6 and 54 inches.

In still another illustrative embodiment, the side skirt wall may be approximately 192 inches long.

In yet another illustrative embodiment, the side skirt wall may be approximately 36 inches tall.

In another illustrative embodiment, the side skirt system may be configured to create an air curtain over a rear gap between a rear edge of the side skirt wall and the forward-most surface of the forward wheel of the rear wheel assembly when air flows around the trailer in order to prevent air from entering an undercarriage region below the trailer.

In still another illustrative embodiment, the trailer may include a second side skirt system coupled to another side wall of the trailer. Illustratively, the first side skirt system may define a first front gap between the landing gear of the trailer and a front edge of the side skirt wall of the first side skirt system. Further illustratively, the second side skirt system may define a second rear gap between a rear edge of the side skirt wall of the second side skirt system and the forward-most position of the rear wheel assembly. The first and second side skirt systems may operate to allow a cross-wind to travel through the first front gap, under the storage container of the trailer, and out through the second rear gap when the trailer is traveling down a highway.

In yet another illustrative embodiment, the side skirt wall may be made of a composite material.

In still another illustrative embodiment, the side skirt system may be angled relative to the side wall of the trailer. Illustratively, a front end of the side skirt system may be positioned laterally-inwardly of a rear end of the side skirt system. In particular, the side skirt system may be angled approximately 1.2 degrees relative to the side wall of the trailer.

According to another aspect of the present disclosure, a trailer having a storage container, a landing gear assembly coupled to the storage container, and a rear wheel assembly coupled to the storage container includes a side skirt system for reducing drag on the trailer. The side skirt system includes a side skirt wall configured to be coupled to one side of the trailer to extend below one side wall of the trailer at least partially along a length of the trailer. Illustratively, a distance between a leg of the landing gear of the trailer and a top, front edge of the side skirt wall is between approximately between 6 and 54 inches. Further, a distance between a rear edge of the side skirt wall and forward-most position of the wheels of the rear wheel assembly is between approximately 54 and 102 inches. Illustratively, the side skirt wall is contiguous.

In one illustrative embodiment, the side skirt wall may be configured to move laterally outwardly and laterally inwardly with respect to a generally vertical axis parallel to the side wall of the trailer when the trailer is in transit.

In another illustrative embodiment, the trailer may include a second side skirt system coupled to another side wall of the trailer. Illustratively, the first the side skirt system may define a first front gap between the landing gear of the trailer and a front edge of the side skirt wall of the first side skirt system. Further, the second side skirt system may define a second rear gap between a rear edge of the side skirt wall of the second side skirt system and the forward-most position of the rear wheel assembly. Illustratively, the first and second side skirt systems may operate to allow a cross-wind to travel through the first front gap, under the storage container of the trailer, and out through the second rear gap when the trailer is traveling down a highway.

In another illustrative embodiment, the side skirt wall may include first and second wall panels engaged with and coupled to each other.

According to another aspect of the present disclosure, a method of reducing drag on a trailer includes providing a first side skirt system on the trailer. The first side skirt system includes a first side skirt wall configured to be coupled to a first side of the trailer to extend below a first side wall of the trailer at least partially along a length of the trailer. The method further includes providing a second side skirt system on the trailer. The second side skirt system includes a second side skirt wall configured to be coupled to a second side of the trailer to extend below a second side wall of the trailer at least partially along a length of the trailer. The method also includes allowing air to enter an undercarriage region below a floor assembly of the trailer adjacent the first side skirt system and allowing the air that entered the undercarriage region to exit the undercarriage region adjacent the second side skirt system when the trailer is in transit.

In one illustrative embodiment, a first, front gap may be provided between a landing gear leg of the trailer and a top, front wall of the first side skirt wall. Illustratively, a second, rear gap may be provided between a rear edge of the second side skirt wall and the forward most position of the rear wheel of the rear wheel assembly of the trailer. Further illustratively, allowing air to enter the undercarriage region may include allowing air to enter the undercarriage region via the first, front gap and to exit the undercarriage region via the second, rear gap. The first, front gap may be approximately between 6 and 54 inches and the second, rear gap may be approximately between 54 and 102 inches.

BRIEF DESCRIPTION OF THE DRAWINGS

FIGS. 4A-8B illustrate a bottom view of the tractor and trailer of FIGS. 1-3 including the side skirt assembly of the present disclosure as well as another tractor and trailer with a prior art skirt assembly, and shows the flow trajectory of air across each of the tractor and trailer combinations.

FIG. 4A illustrates the airflow at 10 MPH and 0 degrees (i.e., no crosswind) across a prior art tractor and trailer combination including an illustrative prior art side skirt assembly coupled to and extending downwardly from each side wall of the trailer and spanning substantially the entire distance between the landing gear and the rear wheel assembly of the trailer.

FIG. 8B illustrates the airflow at 10 MPH and 9 degrees across the tractor and trailer shown in FIGS. 4B, 5B, 6B, and 7B including the side skirt assemblies of the present disclosure.

DETAILED DESCRIPTION OF THE PREFERRED EMBODIMENT

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

Figure 1:
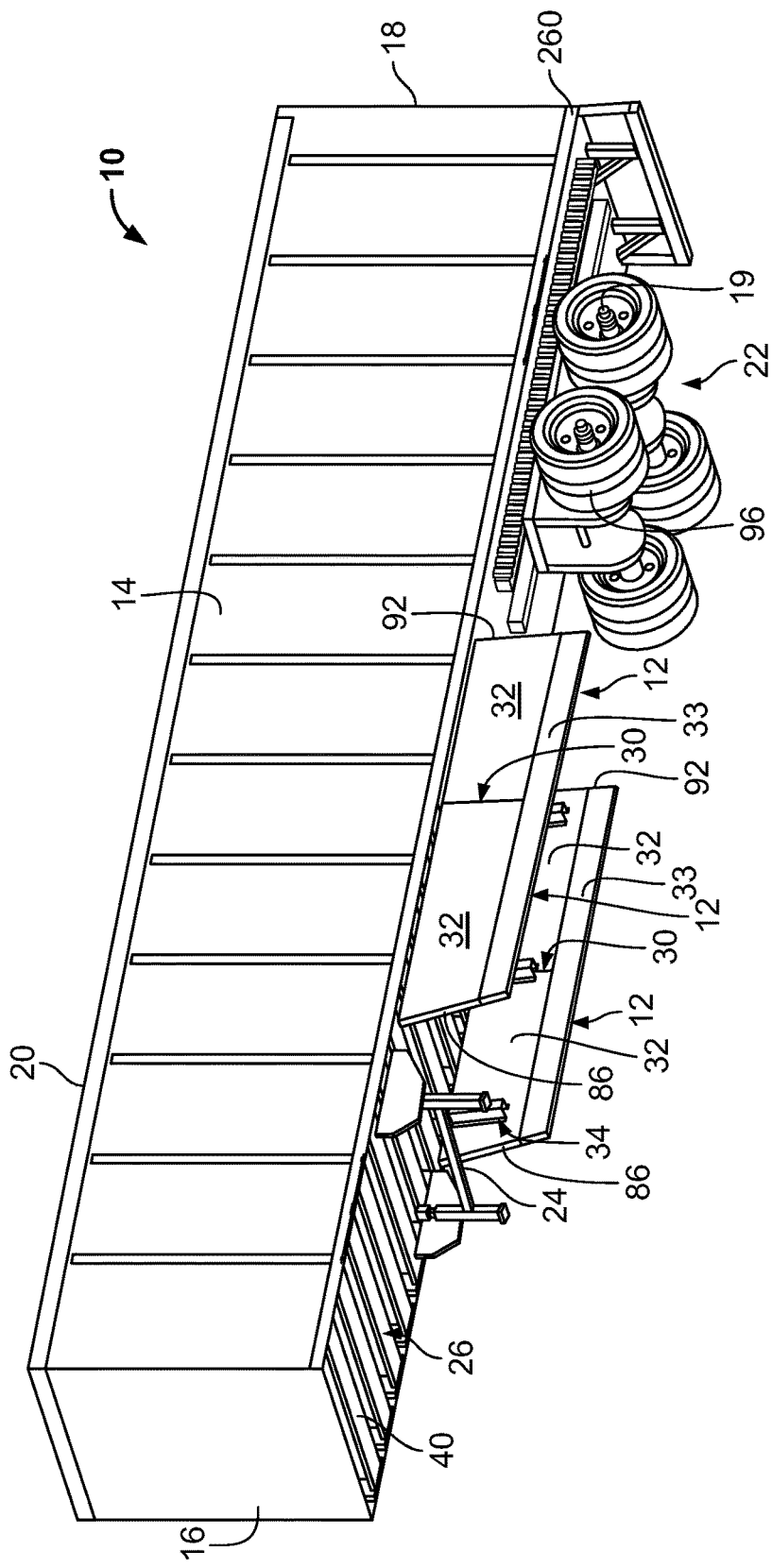
FIG. 1 is a perspective view of a trailer including a side skirt assembly of the present disclosure coupled to and extending downwardly from each side wall of the trailer.

Looking first to FIG. 1, a trailer 10 includes an aerodynamic side skirt system 12 coupled to and extending downwardly from each side wall 14 of the trailer 10. Illustratively, the skirt system 12 operates to improve the aerodynamic efficiency of the trailer 10 by reducing drag and wind flow under the trailer 10. In particular, the skirt system 12 operates to reduce the amount of airflow which becomes trapped under the trailer 10 while the trailer 10 is traveling down the road. As is described in greater detail below, the skirt system 12 further operates to allow air that does get under the trailer, whether it be under the skirt system 12 itself, from under the tractor 15 (shown in FIGS. 2 and 3), or by any other means, to be vented out from under the trailer 10 without imparting much if any energy on the trailer 10. Thus, any increase in drag which would have resulted from the air under the trailer 10 is diminished because this air is able to escape out from under the trailer 15. This reduction of airflow under the trailer 10 as well as the ability of the skirt system 12 to allow air from under the trailer 10 to escape may operate to increase the fuel efficiency, or the efficiency of any other such source of vehicle drive power, of the tractor/trailer combination.

Figure 2:
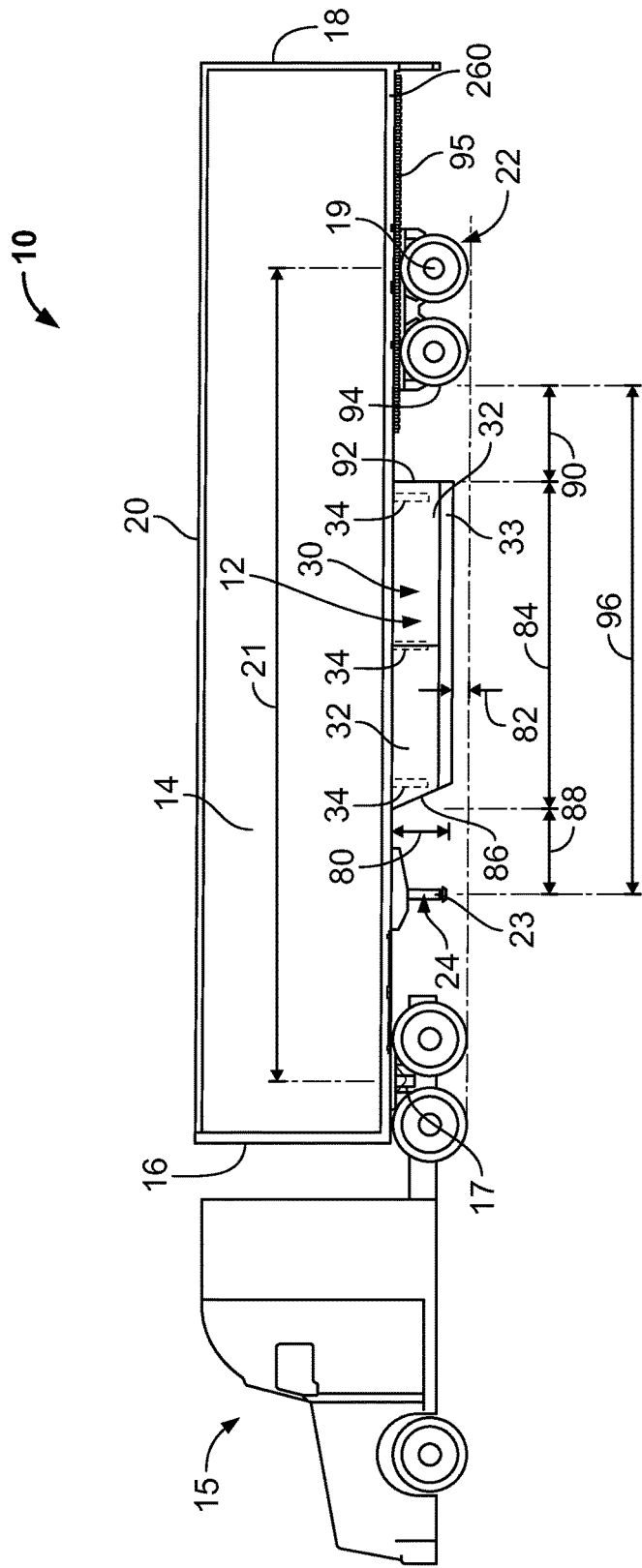
FIG. 2 is a side view of the trailer of FIG. 1 attached to a tractor and showing one of the side skirt assemblies shown in FIG. 1.
Figure 3:
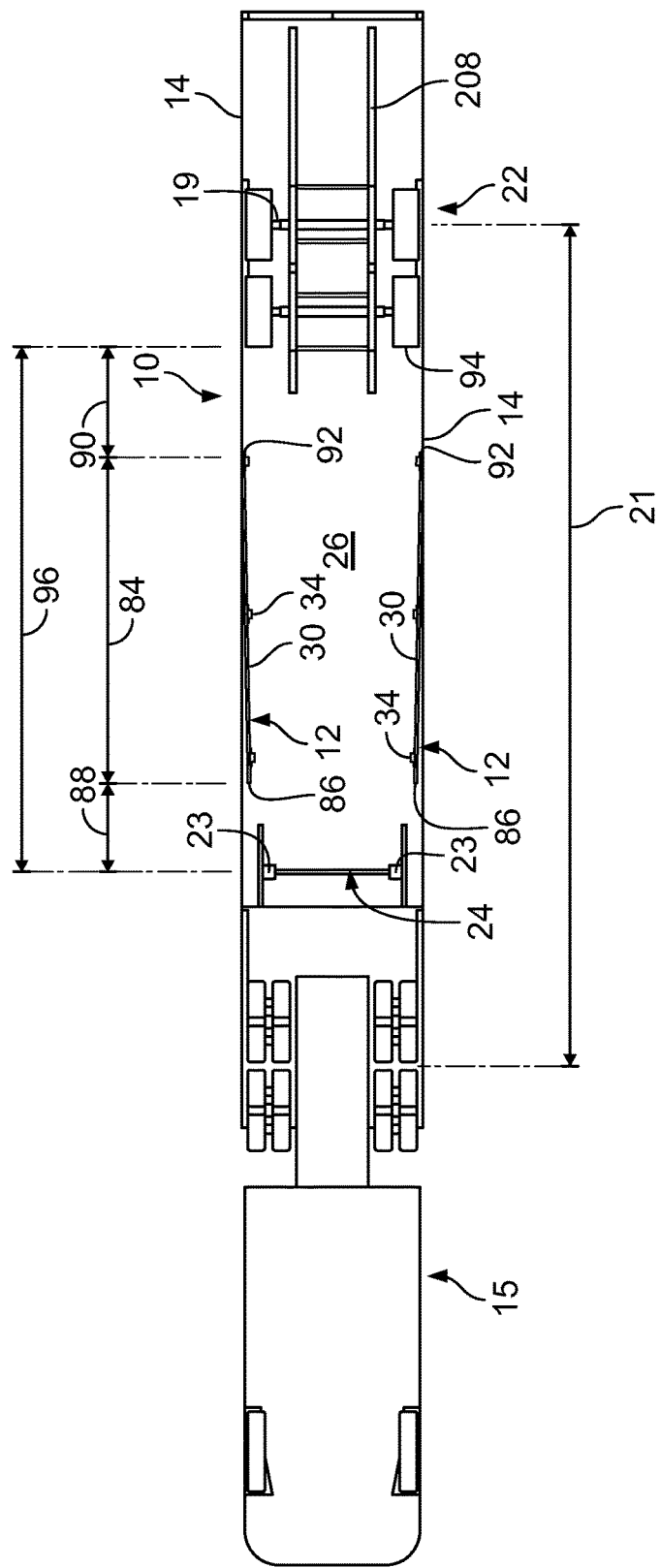
FIG. 3 is a bottom view of the tractor and trailer of FIG. 2 showing the side skirt assembly of the present disclosure angled relative to the side walls of the trailer.

Illustratively, the skirt system 12, as well as other skirt systems described herein, extends below a side wall 14 of the trailer 10 at least partially along a length of the trailer 10. In particular, as discussed in detail below, the skirt system 12 extends generally between the landing gear 24 and a rear wheel assembly 22 of the trailer 10. As shown in FIG. 1, the trailer 10 includes side walls 14, a front end wall 16, a rear end wall 18, and a roof 20 defining an inside storage portion (not shown) able to store various articles or goods therein. The trailer 10 further includes the rear wheel assembly 22 and the front support or landing gear 24 each coupled to a bottom wall or floor assembly 26 of the trailer 10. Illustratively, the floor assembly 26 of the trailer 10 includes various laterally-extending cross members 40 and right and left base rails 260 coupled to the cross members and extending along a length of the trailer 10. The front end of the trailer 10 is configured to be coupled to a tractor 15, as shown in FIGS. 2 and 3, for towing the trailer 10 thereon thus providing a tractor-trailer assembly. It should be understood that while the aerodynamic side skirt system 12 is shown for use with a trailer 10, the side skirt system 12 may be coupled to any vehicle to reduce the drag thereon.

As shown in FIG. 1, the skirt system 12 is coupled to the floor assembly 26 of the trailer 10 to extend downwardly therefrom. Illustratively, the side skirt system 12 is positioned between the rear wheel assembly 22 and the landing gear 24 in order to prevent air from flowing laterally under the floor assembly 26 of the trailer 10 as the trailer 10 is towed by the tractor 15. However, the side skirt system 12 is sized, configured, and positioned such that when air does flow under the trailer 10, the air is allowed to exit back out from under the trailer 10 before imparting its force, and thus causing drag, on any components under the trailer 10. In other words, air that travels under the trailer 10 oftentimes gets stuck under the trailer 10 and generally comes into contact with something under the trailer 10, such as the rear wheel assembly 22, thus imparting drag on the trailer 10. The side skirt system 12 operates to optimize the balance between deflecting the flow of air around the trailer 10 and allowing any air which flows under the trailer 10 to exit, or vent, out from under the trailer 10 thus minimizing any contact between the air under the trailer 10 and the front portion of the rear wheel assembly 22 of the trailer 10. Typically, many side skirt systems operate to try to block all air from flowing under the trailer; however, in actual use, some air will always flow under the trailer and typical side skirt systems do not provide a means for allowing this air to exit from under the trailer. Thus, such air will cause drag on the trailer by contacting the rear wheel assembly 22 and importing rearward force, or drag, thereon.

Illustratively, the trailer 10 includes two aerodynamic skirt systems 12, as shown in FIGS. 1 and 3. In particular, one system 12 is coupled to one side of the floor assembly 26 of the trailer 10 to extend downwardly from the floor assembly 26 while the other system is coupled to the other side of the floor assembly 26 to extend downwardly from the floor assembly 26. For purposes of the description herein, however, only one skirt system 12 will be described herein. However, it should be understood that the two skirt systems 12 of the trailer 10 are identical in configuration and function.

As shown in FIGS. 1-3, the skirt system 12 includes a side skirt wall 30 having two wall panels 32 coupled to each other by an H-member (not shown). The wall panels 32 are further secured to each other and to the trailer 10 by a mounting bracket assembly 34. Illustratively, a first mounting bracket assembly 34 is coupled near a front end of the front-most wall panel 32, a second mounting bracket assembly 34 is positioned between and coupled to the two adjacent wall panels 32, and a third mounting bracket assembly 34 is coupled near a rear end of the rear-most wall panel 32 of the side skirt wall 30. While the skirt system 12 includes three illustrative mounting bracket assemblies 34 and two wall panels 32, it is within the scope of this disclosure to provide a skirt system 12 having any number of mounting bracket assemblies 34 and any number of wall panels 32. Further, it is within the scope of this disclosure for the skirt system 12 to include a single, unitary wall panel 32 as well as any number of multiple wall panels 32 coupled together to define the side skirt wall 30.

Illustratively, the mounting bracket assembly 34 of the skirt system 12 disclosed herein may be the same as or similar to the various mounting bracket assemblies disclosed in U.S. Pat. No. 8,177,286, the entirety of which is hereby expressly incorporated by reference herein. In particular, the mounting bracket assemblies 34 of the skirt system 12 of the present disclosure are configured to couple the wall portions 32 of the skirt system 12 to the floor assembly 26 of the trailer 10. Furthermore, the mounting bracket assemblies 34 allow the skirt system 12 to tilt laterally both inwardly and outwardly relative to the floor assembly 26 of the trailer 10. The ability of the skirt wall 20 to tilt bi-laterally relative to the cross members 40 (i.e., to tilt both inwardly and outwardly relative to the cross member 40) allows the skirt wall 30 to potentially avoid damage when the trailer 10 traverses into or over a fixed immovable obstacle, for example, and/or runs laterally into the obstacle, for example. It should also be understood, however, that the skirt system 12 be sufficiently rigidly mounted to the floor assembly 26 such that the skirt system 12 is generally prevented from tilting under normal wind and road air forces. In use, the mounting bracket 34 is spring-mounted to the cross-member 40 of the trailer 10 in order to allow the skirt wall 30 coupled to the mounting bracket assembly 34 to tilt therewith. It should be understood that while the side skirt system 12 is disclosed as including the particular mounting bracket assemblies of the '286 patent, it is within the scope of this disclosure for the side skirt system 12 to include any suitable mounting bracket assemblies configured to couple the side skirt wall 30 to the storage container of the trailer 10.

As shown in FIG. 2, each skirt wall 30 of the present disclosure defines a height 80 that is approximately 36 inches (i.e., 3 feet). The height 80 defines the total height of the skirt wall 30, including the height of the wall panel 32 and the height of a flexible member 33 of the wall 30. The flexible member 33 is coupled to the bottom edge of the wall panels 32 and is illustratively made of plastic. However, other suitable materials may be used as well. The flexible member 33 operates to further resist airflow and may prevent damage to the skirt wall 30 from forces applied vertically such as in situations where the trailer 10 may traverse over a curb or railroad track where the road surface is not flat. In such instances, for example, the flexible member 33 is configured to bend, or flex, to prevent damage to the skirt wall 30. Illustratively, the skirt system 12 includes a single, unitary flexible member 33 coupled to the two wall panels 32. However, it is within the scope of this disclosure to include any number of flexible members 33.

Illustratively, a distance 82 between a bottom edge of the skirt wall 30 and the ground upon which the trailer 10 rests is approximately 7 inches. This distance 82 represents the ground clearance between the bottom edge of the skirt wall 30 and the ground upon which the trailer 10 rests. Typically, many side skirt systems are shorter than the skirt wall 30 of the present disclosure and typically define a height of approximately 32 inches to provide for an additional 4 inches of ground clearance greater than that of the side skirt wall 30 of the present disclosure. A decreased ground clearance may provide the opportunity for the side skirt wall 30 to be impacted by more objects, such as rocks, debris, raised speed bumps, and/or curbs, for example, as the trailer 10 travels along a road or highway. Impact with such objects may damage the side skirt wall 30. Thus, increasing the height 80 of the side skirt wall 30 may also operate to increase the chances of potentially damaging the side skirt wall 30 during normal operation thereof. However, increasing the height 80 also operates to reduce the amount of airflow which is able to travel under the skirt wall 30 as the trailer 10 travels down the highway.

Further, as shown in FIG. 2, the side skirt wall 30 defines a total length 84 across a top edge of the side skirt wall 30 of approximately 192 inches (i.e., 16 feet) from a front end of the wall 30 to a rear end of the wall 30. It should be understood that the total length 84 of the side skirt assembly 12 includes the total length of all contiguous walls or wall portions 30 of the side skirt assembly 12 which depend from the sidewall 14 of the trailer 10. As shown in FIG. 2, a front edge 86 of the front-most wall panel 32 is angled relative to a vertical axis such that a length across a bottom edge of the side skirt wall 30 is smaller than the total length 84 of the side skirt wall 30 as measured across the top edge of the wall 30. It should be understood, however, that while the front edge 86 is configured to angle rearwardly from the top edge of the skirt wall 30 to the bottom edge of the skirt wall 30, the front edge 86 may instead be generally vertical or may be configured to angle forwardly.

Typically, the total length of many skirt assemblies is approximately 285 inches (i.e., 23 feet, 9 inches). As such, a typical skirt assembly of this length generally spans most of the distance between the landing gear and the rear wheel assembly of the trailer leaving a relatively small gap between both the landing gear and a front end of the skirt wall as well as between the rear wheel assembly of the trailer and a rear end of the skirt wall. For example, as shown in FIGS. 4A, 5A, 6A, 7A, and 8A, an illustrative prior art trailer 210 is provided. The prior art trailer 210 includes a prior art skirt assembly 212 such as the illustrative skirt assemblies described in U.S. Pat. No. 8,177,286, for example. Thus, the skirt assembly 212 of the trailer 210 includes a side skirt wall 230 that is approximately 285 inches and is positioned between the leg 23 of the landing gear 24 and the rear wheel assembly 22 of the trailer 210 in order to provide the relative small front gap 288 between the front edge 286 of the side skirt assembly 212 and the landing gear 24 and the relatively small rear gap 290 between the rear edge 292 of the side skirt assembly 212 and the forward-most surface of the front tires 294 of the rear wheel assembly 222.

The side skirt wall 30 of the present disclosure, however, is much shorter in length than a typical side skirt wall, such as the illustrative side skirt wall 230 of the side skirt assembly 212. As such, a gap 88 between the top-most portion of the front edge 86 of the skirt wall 30 and a leg 23 of the landing gear 24 of the trailer 10 is larger than that which is present when a typical side skirt wall, such as the wall 230, is attached to the same or similar trailer 10. Illustratively, the gap 88 shown in FIG. 3 is approximately 50 inches, whereas such a gap 288 between the landing gear leg 23 and the same front edge 286 of the illustrative prior art side skirt assembly 212 may only be approximately 6 inches.

Further, the trailer 10 includes a rear gap 90 between a rear edge 92 of the side skirt wall 30 and between a forward-most surface 94 of the forward tires of the rear wheel assembly 22, as shown in FIG. 2. Illustratively, the rear wheel assembly 22 of the trailer 10 shown in FIG. 2 is positioned on a 208" sliderail 95 and is movable forward and backward along the sliderail 95. As shown in FIG. 2, the rear wheel assembly 22 is in a forward-most position along the sliderail 95, thus minimizing the rear gap 90 between the rear edge 92 of the side skirt wall 30 and the forward-most surface 94 of the forward tires of the rear tire assembly 22. As noted above, the rear tire assembly 22 is movable along the sliderail 95 to any number of positions. Thus, the distance of the rear gap 90 is increased as the rear tire assembly 22 is moved rearwardly relative to the floor assembly 26 of the trailer 10. Illustratively, the aforementioned gap sizes, as well as all gap sizes mentioned herein, are taken when the rear wheel assembly 22 is positioned such that a distance 21 between a kingpin 17 of the trailer 10 and the center of the rear-most axle 19 is 40 feet.

Figure 4A:
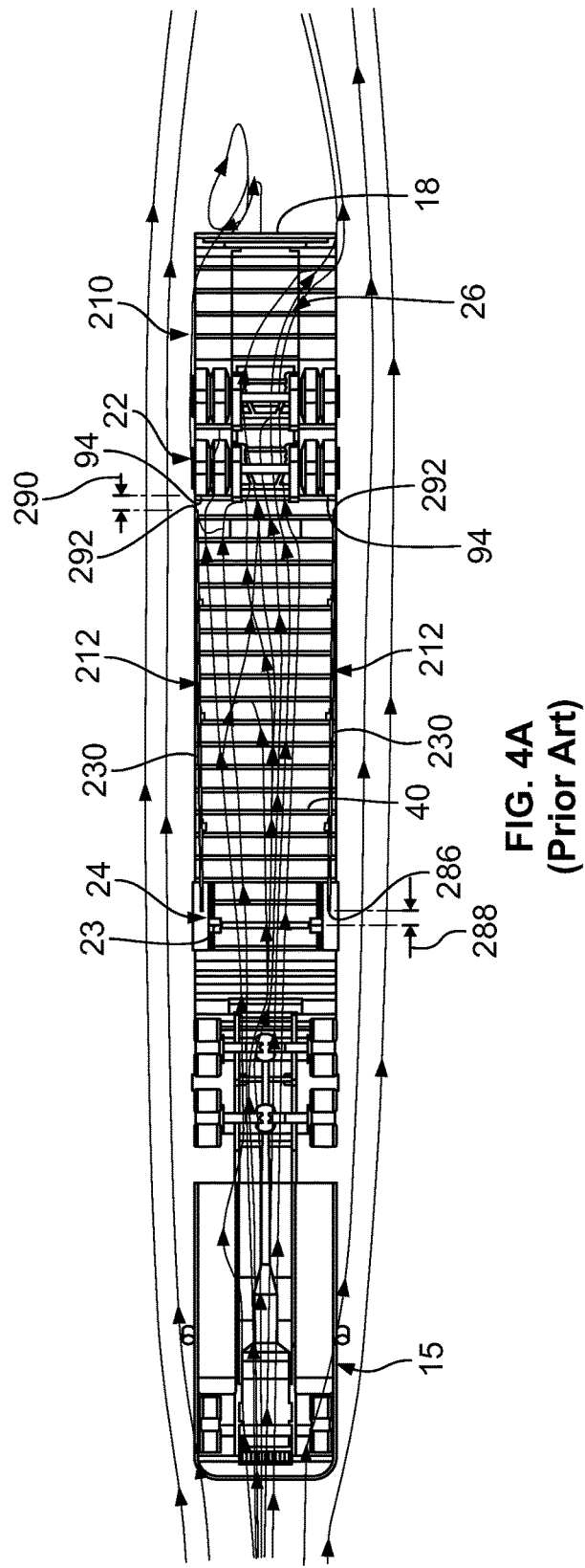

Illustratively, many typical side skirt systems such as the illustrative side skirt assembly 212 of FIG. 4A operate to minimize a rear gap between a rear edge of the skirt system and a front surface of the tire assembly when the tire assembly is in the forward-most position. Contrary to convention thinking, however, the trailer 10 of the present disclosure includes a rear gap 90 between approximately 50 inches and 60 inches (when the rear tire assembly 22 is in its forward-most position), and preferably includes a rear gap 90 that is approximately 57 inches. It should be understood, however, that the trailer 10 may include a rear gap 90 that is greater or lesser than that which is shown and disclosed above.

Illustratively, the total distance 96 between the landing gear 22 and the front surface 94 of the rear wheel assembly 22 (when the rear wheel assembly 22 is in a forward-most position) is approximately 299 inches. As noted above, the front gap 88 of the trailer 10 is approximately 50 inches and the rear gap 90 is approximately 57 inches. Thus, an aggregate gap, i.e., a total length between the landing gear 24 and front surface 94 of the rear wheel assembly 22 that is open, or uncovered by the side skirt assembly 12, is approximately 107 inches. Accordingly, the side skirt wall 30 of the present disclosure is approximately 64% of the total distance 96 between the landing gear 24 and the front surface 94 of the rear wheel assembly 22. As such, the total, or aggregate, gap areas (88 and 90) make up approximately 36% of the total distance 96 between the landing gear 24 and the front surface 94 of the rear wheel assembly 22. Thus, the length 84 of the side skirt wall 30 is approximately 1.8 times as long as the total gap length between the landing gear 24 and the front surface 94 of the rear wheel assembly 22. In other words, the covered area between the landing gear 24 and the front surface 94 of the rear wheel assembly 22 is approximately 1.8 times as long as the uncovered areas between the landing gear 24 and the front surface 94 of the rear wheel assembly 22.

While the above dimensions are illustrative in nature, it is within the scope of this disclosure to provide a trailer 10 having a front gap 88 that is approximately between 6-54 inches, a rear gap 90 that is approximately between 54-102 inches, and a side skirt wall 30 having a length 84 of approximately between 192-240 inches. It is further within the scope of this disclosure to provide a total gap distance that is approximately between 20-52% of the total distance 96 between the landing gear 24 and the front surface 94 of the rear wheel assembly 22, and to also provide a side skirt wall 30 that is approximately between 48-80% of the total distance 96 between the landing gear 24 and the front surface 94 of the rear wheel assembly 22 of the trailer 10.

Figure 4B:
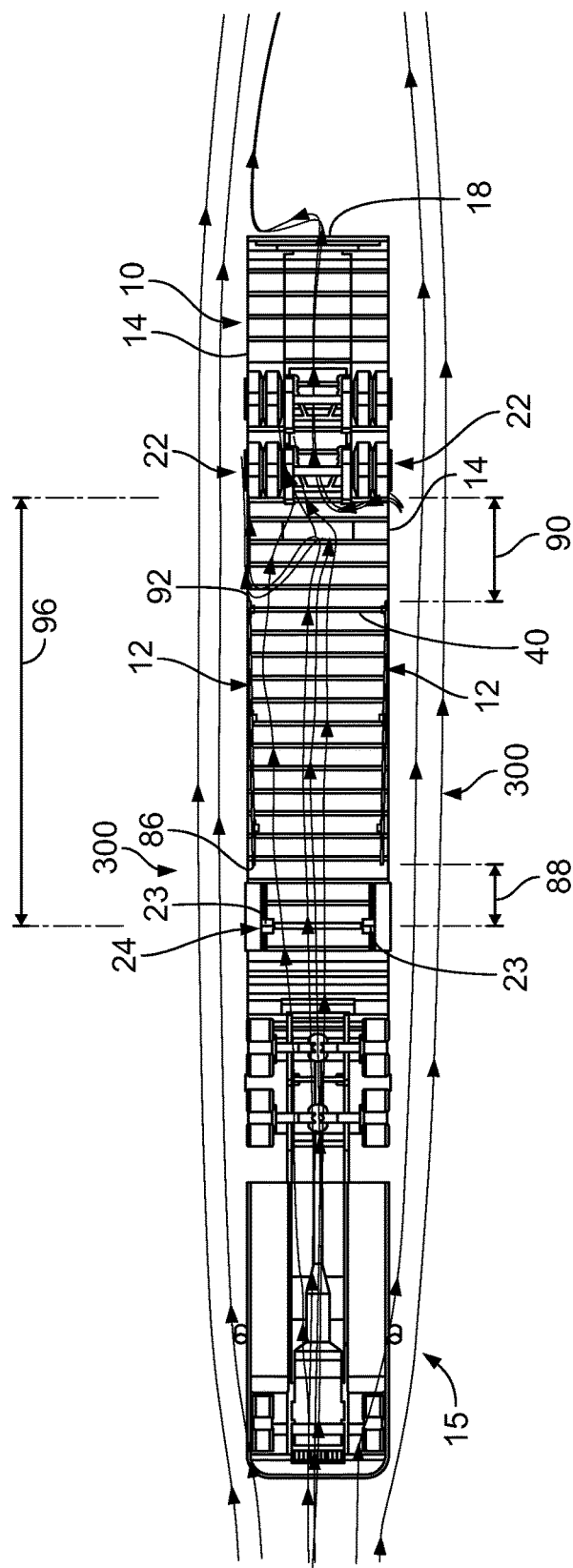
FIG. 4B illustrates the airflow at 10 MPH and 0 degrees across the tractor and trailer of FIGS. 2-3 including the side skirt assemblies of the present disclosure also shown in FIGS. 1-3.

As is discussed in greater detail below, it has been found through testing that such a side skirt assembly 12 having the dimensions, configuration, and placement described above to provide the aforementioned front and rear gap 88, 90 dimensions, as well as a total height 80 of approximately 36 inches provides significant beneficial aerodynamic qualities as compared to typical side skirt assemblies, such as the illustrative side skirt assembly 212, which operate to minimize any gaps between landing gear 24 and the skirt wall 230 and between the rear wheel assembly 22 and the skirt wall 230. In particular, looking to FIGS. 4A-8B of the present disclosure, the flow trajectory of air across the tractor 15 and trailer 10 having the side skirt assembly 12 as well as across an illustrative tractor 15 and trailer 210 having the prior art side skirt assembly 212 is shown. For example, FIG. 4A shows the airflow around the tractor and prior art trailer 210 including the prior art side skirt assembly 212 when air is directly impinged on the front of the tractor 15 and at angle of attack of 0 degrees (i.e., the air flowing onto the tractor 15 is generally parallel to the longitudinal axis of the tractor 15 and trailer 210). Similarly, FIG. 4B shows the airflow around the tractor 15 and trailer 10 with the side skirt assembly 12 of the present disclosure also when air is directly impinged on the front of the tractor 15 at an angle of attack of 0 degrees. Illustratively, the airflow in both FIGS. 4A and 4B is traveling at 10 MPH.

Figure 5A:
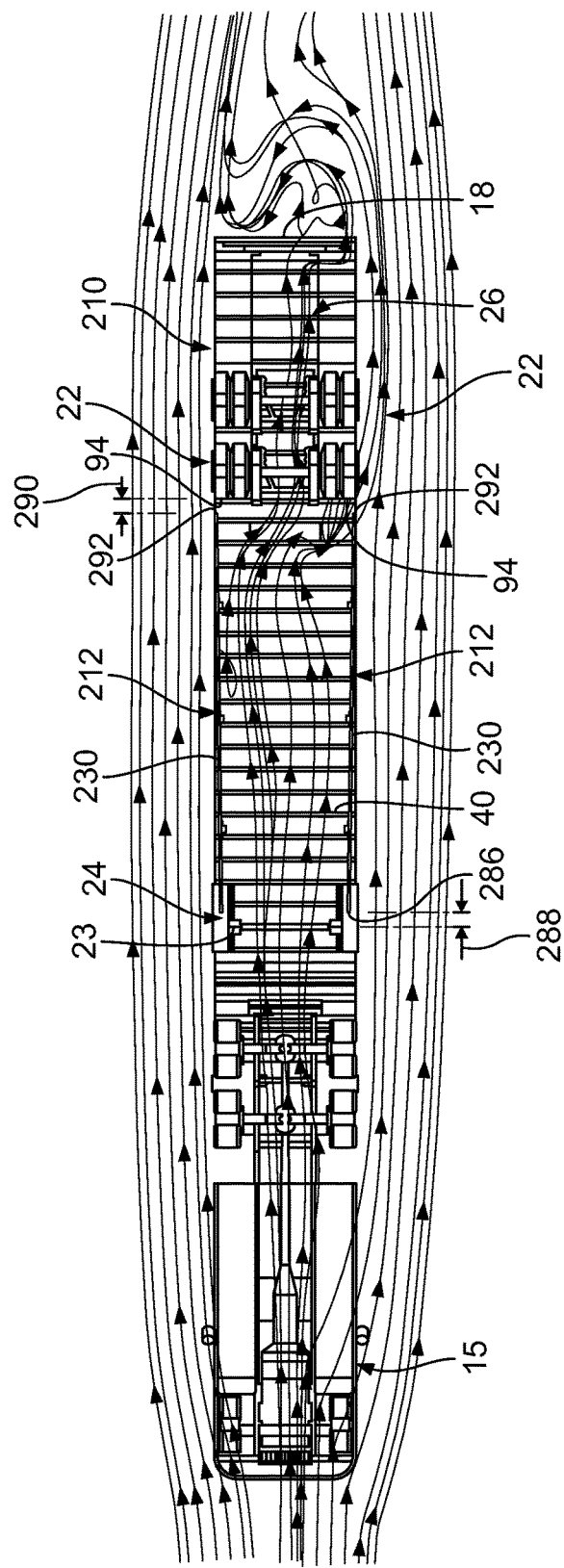
FIG. 5A illustrates the airflow at 10 MPH and 1 degree (thus, representing a crosswind) across the prior art tractor and trailer of FIG. 4A including the prior art side skirt assemblies shown in FIG. 4A.
Figure 5B:
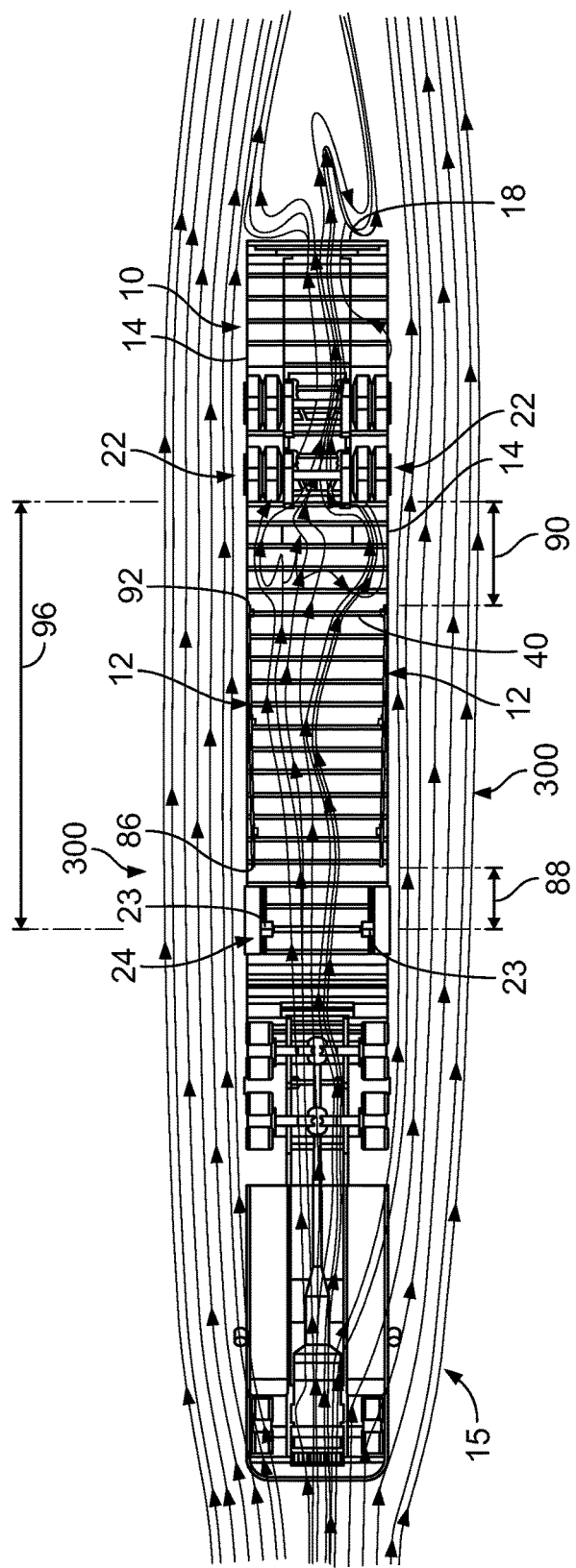
FIG. 5B illustrates the airflow at 10 MPH and 1 degree across the tractor and trailer shown in FIG. 4B including the side skirt assemblies of the present disclosure.

FIGS. 5A and 5B each illustrate the airflow at 10 MPH across the respective tractor 15 and trailer 10, 210 when the airflow is forced over the tractor 15 and trailer 10, 210 at a 1 degree angle relative to the longitudinal axis of the trailer 10, 210. In other words, a crosswind that is angled one degree from a central, longitudinal axis is impinged onto the tractor 15 and trailer 10, 210. FIG. 5A specifically illustrates this airflow over the tractor 15 and illustrative prior art trailer 210 including the illustrative prior art skirt assembly 212 while FIG. 5B illustrates this airflow over the tractor and trailer 10 including the illustrative skirt assembly 12 of the present disclosure.

Figure 6A:
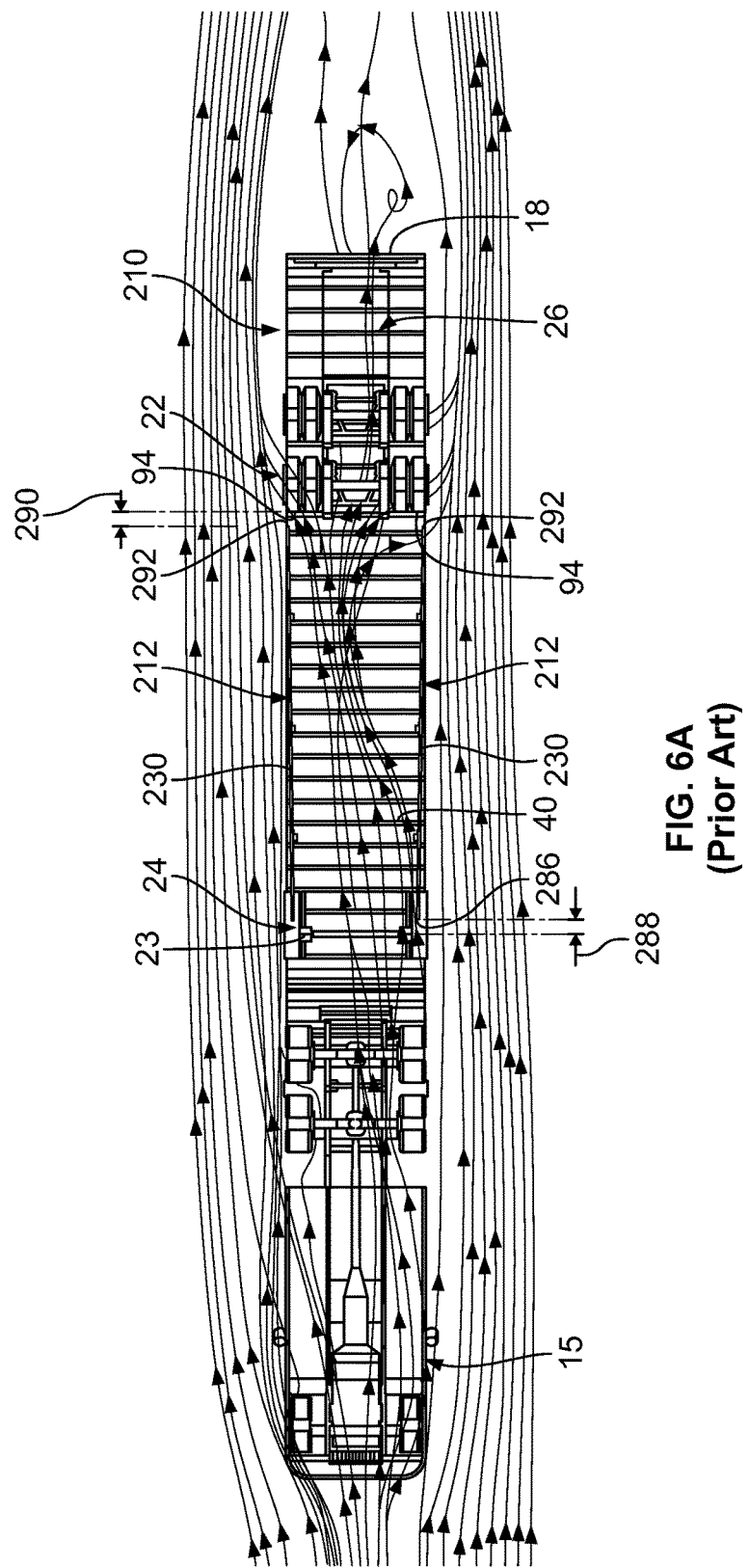
FIG. 6A illustrates the airflow at 10 MPH and 3 degrees across the prior art tractor and trailer of FIGS. 4A and 5A including the prior art side skirt assembly shown in FIGS. 4A and 5A.
Figure 6B:
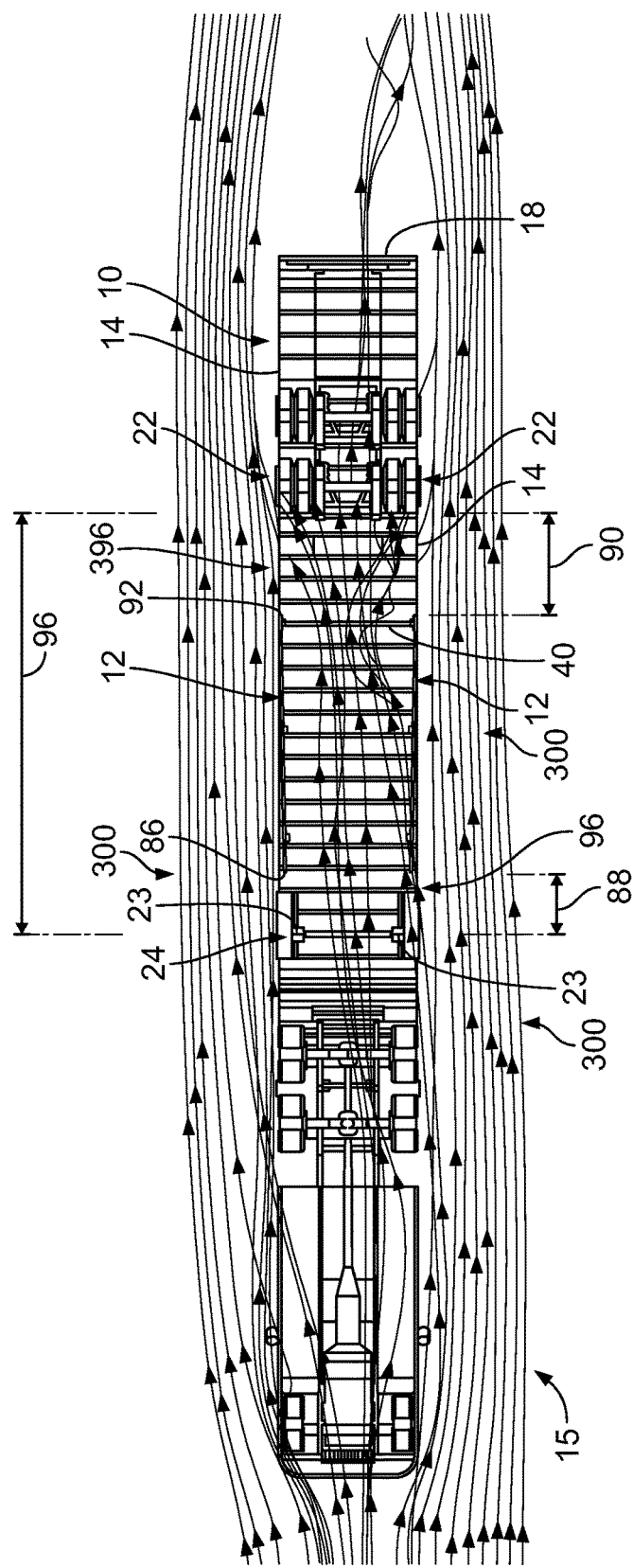
FIG. 6B illustrates the airflow at 10 MPH and 3 degrees across the tractor and trailer shown in FIGS. 4B and 5B including the side skirt assemblies of the present disclosure.
Figure 7A:
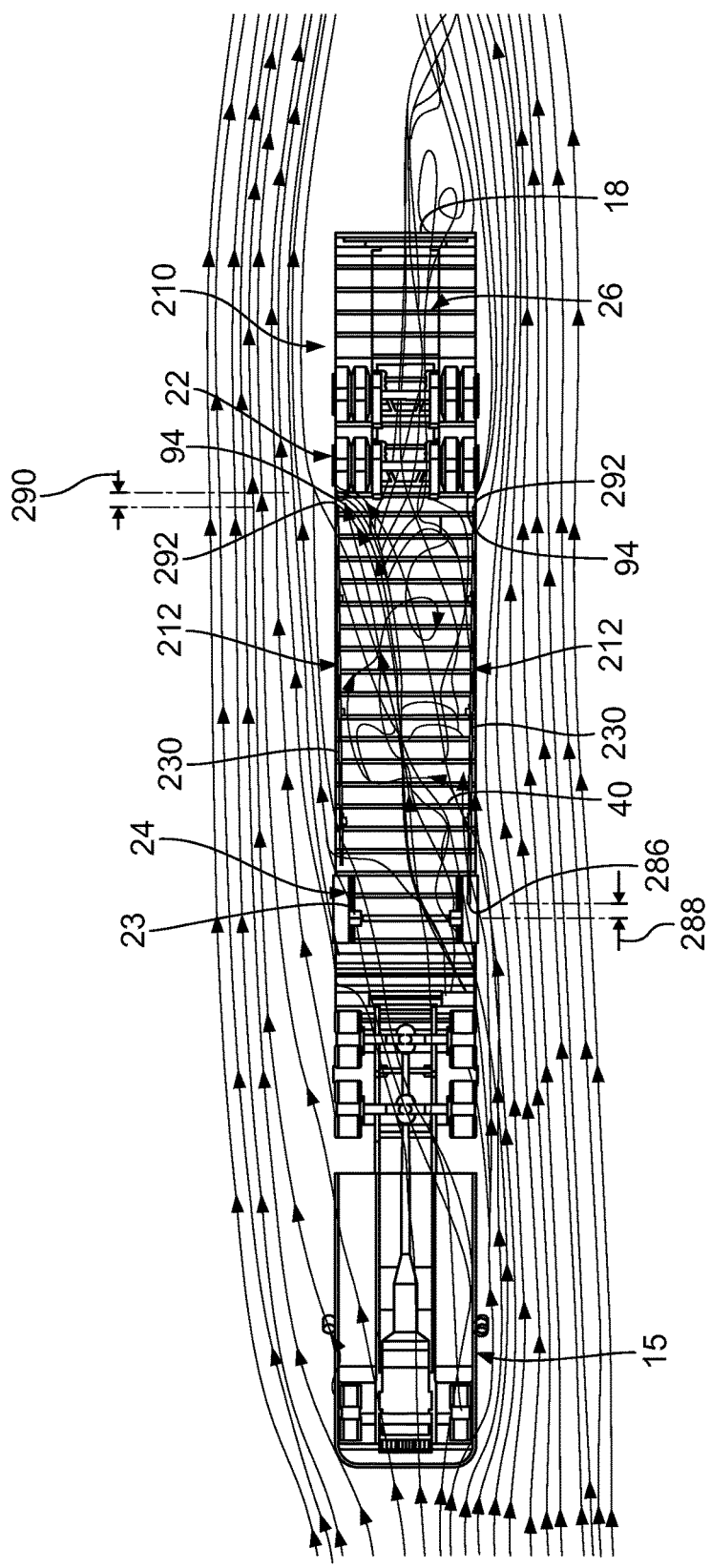
FIG. 7A illustrates the airflow at 10 MPH and 6 degrees across the prior art tractor and trailer including the prior art side skirt assemblies shown in FIGS. 4A, 5A, and 6A.
Figure 7B:
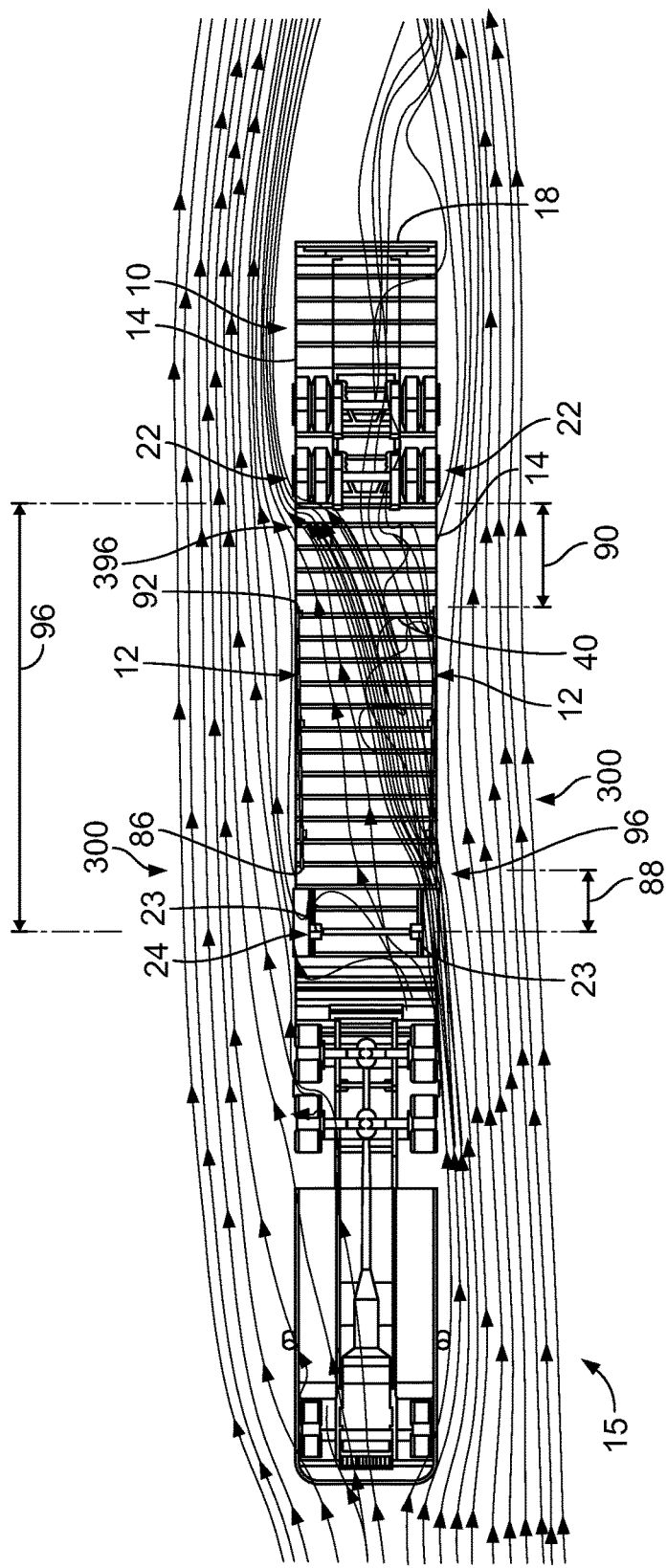
FIG. 7B illustrates the airflow at 10 MPH and 6 degrees across the tractor and trailer shown in FIGS. 4B, 5B, and 6B including the side skirt assemblies of the present disclosure.
Figure 8A:
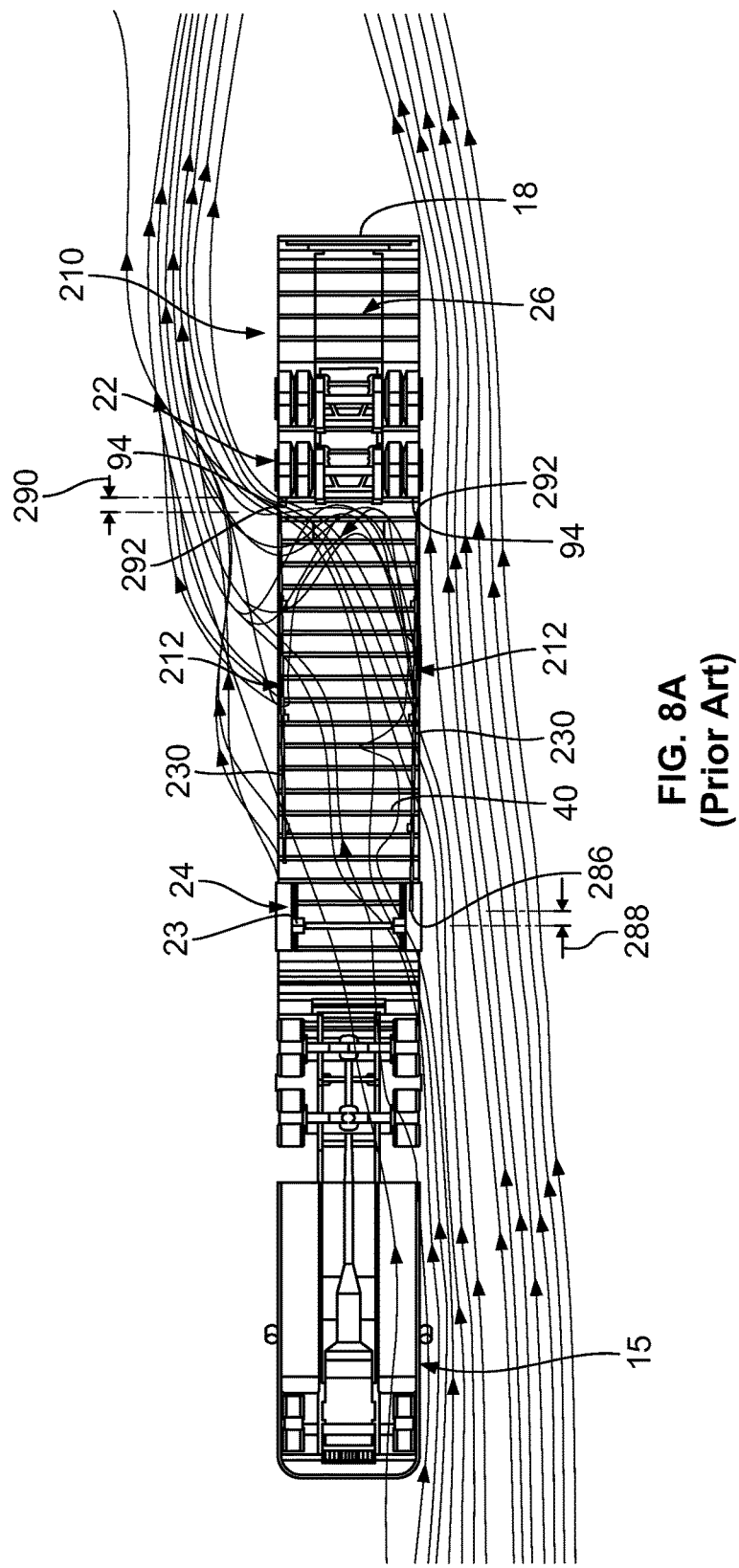
FIG. 8A illustrates the airflow at 10 MPH and 9 degrees across the prior art tractor and trailer shown in FIGS. 4A, 5A, 6A, and 7A including the prior art side skirt assemblies also shown in FIGS. 4A, 5A, 6A, and 7A.
Figure 8B:
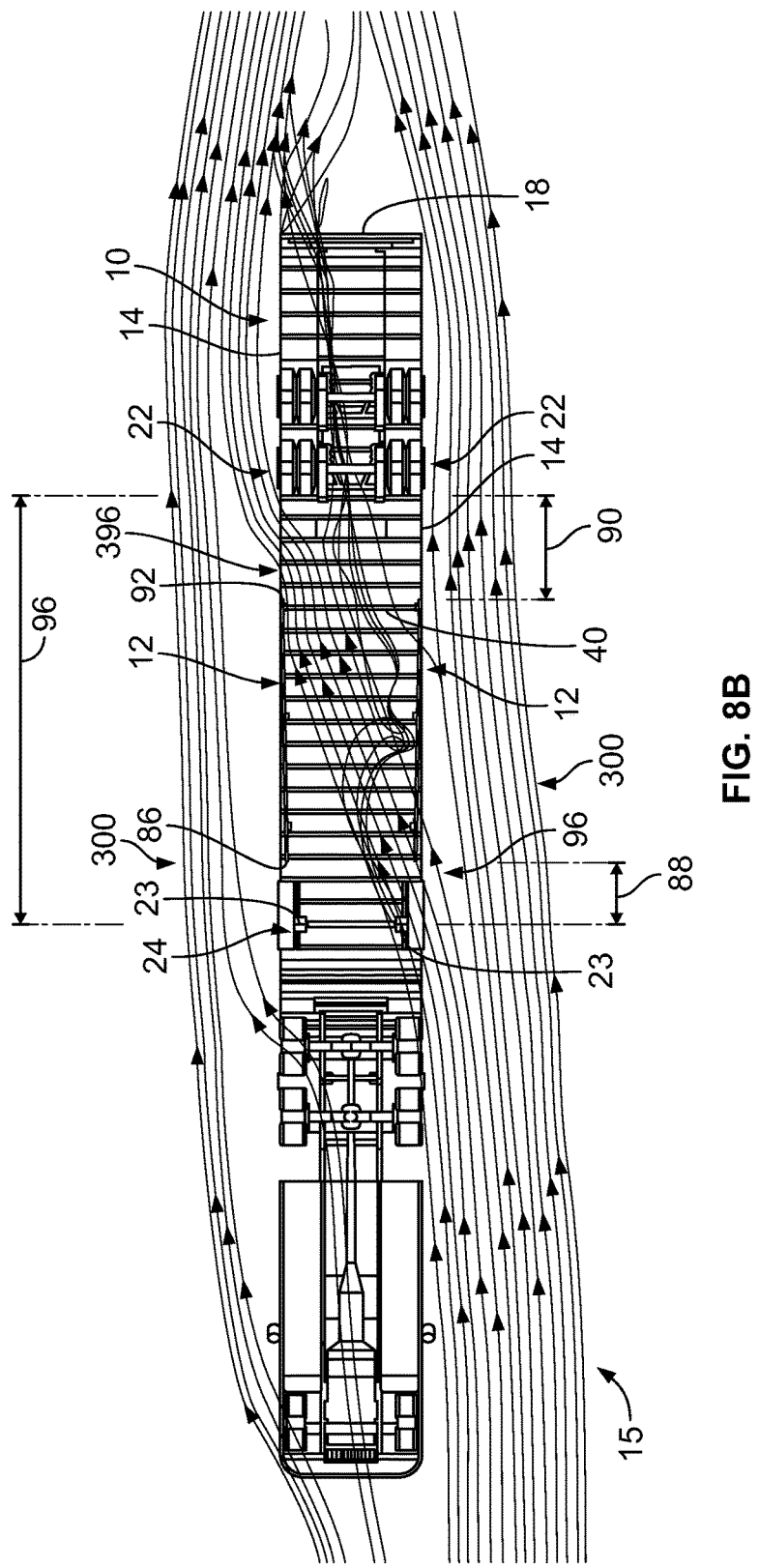

FIGS. 6A and 6B illustrate the airflow across the respective tractor 15 and trailer 10, 210 when the airflow is forced over the tractor 15 and trailer 10, 210 at 10 MPH and at a 3 degree angle. FIGS. 7A and 7B illustrate the airflow across the respective tractor 15 and trailer 10, 210 when the airflow is forced over the tractor 15 and trailer 10, 210 at 10 MPH and at a 6 degree angle. FIGS. 8A and 8B illustrate the airflow across the respective tractor 15 and trailer 10, 210 when the airflow is forced over the tractor 15 and trailer 10, 210 at 10 MPH and at a 9 degree angle. As shown in FIGS. 4A-8B, the airflow is substantially deflected around the trailer 10 by the side skirt systems 12 coupled to each sidewall 14 of the trailer 10 such that an air curtain 300 is formed over the front gap 88 and the rear gap 90 of the trailer 10. In other words, the side skirt system 12 is configured to create an air curtain over the front gap 88 and the rear gap 90 when air flows around the trailer 10, thus operating to substantially prevent air from entering an undercarriage region below the floor assembly 26 of the trailer 10.

Thus, the flow of air is substantially prevented from entering the undercarriage region of the trailer 10 from the side of the trailer 10 in order to reduce the drag on the trailer 10. Furthermore, the range of angles and positions at which the side skirt system 12 may be positioned is optimized to balance the ground speed wind vector and the side wind vector. The drag force required to deflect air around the rear wheel assembly 22 is balanced with the ability of the side skirt system 12 to also vent air from under the trailer 10 before such air imparts a significant drag on the underbody of the trailer 10. In particular, as the angle of the crosswind is increased, the side skirt system 12 operates to allow a certain amount of air 96 to flow into the front gap 88 on the side of the trailer 10 where the crosswind impacts the trailer 10, as shown in particular in FIGS. 6B, 7B, and 8B, for example. This air 96 that flows through the front gap 88 is then allowed to flow under the undercarriage of the trailer 10 and across the trailer 10 to exit as exit air 396 via the rear gap 90 on the opposite side of the trailer 10 and defined by the opposite side skirt system 12, as shown best in FIGS. 6B, 7B, and 8B. Exit air 396 may include air 96 and other air that enters the undercarriage area of the trailer 10 when the trailer 10 is in the transit. By allowing some of the crosswind air 96 to flow through the front gap 88 of the first side skirt system 12 and out the rear gap 90 of the second side skirt system 12 while maintaining a high velocity, the flow of air is controlled, does not substantially impinge on the rear wheel assembly 22, and thus further operates to reduce the drag on the trailer 10. The balance between deflecting air (i.e., creating the air curtain 300) and allowing air, such as air 396 to pass out from under the trailer 10 is a function of the size, configuration, and positioning of the side skirt assembly 12 on the trailer 10. As shown in FIGS. 4A-8B, when the resulting vector of ground speed and side wind is beyond a certain angle, i.e, beyond approximately 6%, the side skirt system 12 may cause less drag to be imparted on trailer 10 than the conventional "full-length" side skirt system, such as the side skirt assembly 212, by creating a controlled pathway to allow air to enter the undercarriage of the trailer 10 and then vent out from under the undercarriage of the trailer 10, rather than by trying only to deflect all of the air around the trailer 10.

In particular, testing and analysis provides that the reduction in the coefficient of drag of the trailer 10 having the side skirt system 12 of the present disclosure is similar to the reduction in the coefficient of drag of a trailer 210 having a side skirt system 212 where the side skirt is 285 inches long and 32 inches tall as compared to a control trailer without any side skirt system. In fact, the reduction in the coefficient of drag of the trailer 10 of the present disclosure is greater than the reduction in coefficient of drag of the trailer 210 having the 285 inches long and 32 inches tall skirt system when a 9 degree crosswind of 10 MPH is present while the trailers 10, 210 are traveling at 65 MPH.

As noted above, the side skirt wall 30 of the skirt system 12 of the present disclosure is relatively shorter than many prior art skirt systems. Thus, the side skirt system 12 operates to minimize the total part numbers of the side skirt system 12 as well as the overall weight of the side skirt system 12. Minimizing the total number of parts of the side skirt system 12 operates to reduce the overall cost to purchase the side skirt system 12 as well as the time required to install the side skirt system 12 on a trailer, such as the trailer 10. Reducing the time to install the side skirt system 12 on the trailer 10 also reduces the cost to install the system 12 on the trailer 10. Furthermore, minimizing the size of the side skirt system 12 also operates to minimize the weight of the side skirt system 12. Minimizing the weight of any accessory added to a trailer 10 operates to maximize the fuel efficiency of the tractor 15 pulling the trailer 10 along the highway. It should be understood that such reductions in size and weight may be counterintuitive to the conventional thinking that a taller skirt may may provide the opportunity for the side skirt wall 30 to be impacted by more objects, such as rocks, debris, raised speed bumps, and/or curbs, for example, as the trailer 10 travels along a road or highway.

Illustratively, each wall panel 32 is made of a composite material. For example, the composite material may include a plastic core and metal outer skins coupled to the plastic core. Such a composite material provides a rigid, but lightweight and durable material. Illustratively, for example, each wall 32 may be made of a DURAPLATE® composite panel provided by Wabash National Corporation of Lafayette, Ind. DURAPLATE® composite panels are constructed of a high-density polyethylene plastic core bonded between two high-strength steel skins. It should be understood that other suitable composite materials may be used as well. Further, the wall panels 32 may be of any number of suitable, non-composite materials such as metals, metal alloys, and/or plastics, for example.

As shown in FIG. 3, the side skirt systems 12 includes skirt walls 30 which are angled, and not parallel, relative to the side walls 14 of the trailer 10 when the trailer is viewed from below, for example. In particular, each of the right and left skirt walls 30 may be installed inwardly from the side walls 14 of the trailer 10 at the front end of the trailer 10 to mount a front end of each skirt wall 30 laterally inwardly of a plane defined by the nearest side wall 14 of the trailer 10. Illustratively, as shown in FIG. 3, the rear end of the skirt wall 30 is generally aligned with the side wall 14 of the trailer 10. As such, each skirt wall 30 is angled outwardly from the front end of the skirt wall 30 to the rear end of the skirt wall 30. The particular skirt wall 30 of the illustrative side skirt system 12 is angled approximately 1.2 degrees relative to the side wall 14 of the trailer 10. However, it should be understood that the skirt wall 30 may be angled relative to the side wall 14 of the trailer 10 by any suitable degree. It should further be understood that the skirt wall 30 may be parallel to the side walls 14 of the trailer 10 as well.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A trailer having a storage container, a landing gear assembly coupled to the storage container, and a rear wheel assembly coupled to the storage container, the trailer comprising:
   a side skirt system for reducing drag on the trailer including a side skirt wall configured to be coupled to one side of the trailer to extend below one side wall of the trailer at least partially along a length of the trailer, wherein a length of the side skirt wall along a top edge of the side skirt wall is approximately 48%-80% of a distance between the landing gear and forward-most surface of a forward wheel of the rear wheel assembly when the rear wheel assembly is in a forward-most position on the trailer, a front gap being formed between a leg of the landing gear and a top, front edge of the side skirt wall and a rear gap being formed between a rear edge of the side skirt wall and the forward wheel of the rear wheel assembly when the rear wheel assembly is in the forward-most position of the trailer, the rear gap being between approximately 54 and approximately 102 inches.

2. The trailer of claim 1, wherein the front gap is between approximately 6 inches and approximately 54 inches.

3. The trailer of claim 1, wherein the side skirt wall is approximately 192 inches long.

4. The trailer of claim 1, wherein the side skirt wall is approximately 36 inches tall.

5. The trailer of claim 1, wherein the side skirt system is configured to create an air curtain over a rear gap between a rear edge of the side skirt wall and the forward-most surface of the forward wheel of the rear wheel assembly when air flows around the trailer in order to prevent air from entering an undercarriage region below the trailer.

6. The trailer of claim 1, wherein the trailer includes a second side skirt system coupled to another side wall of the trailer, wherein the first side skirt system defines a first front gap between the landing gear of the trailer and a front edge of the side skirt wall of the first side skirt system, wherein the second side skirt system defines a second rear gap between a rear edge of the side skirt wall of the second side skirt system and the forward-most position of the rear wheel assembly, wherein the first and second side skirt systems operate to allow a cross-wind to travel through the first front gap, under the storage container of the trailer, and out through the second rear gap when the trailer is traveling down a highway.

7. The trailer of claim 1, wherein the side skirt wall is made of a composite material.

8. The trailer of claim 1, wherein the side skirt system is angled relative to the side wall of the trailer.

9. The trailer of claim 8, wherein a front end of the side skirt system is positioned laterally-inwardly of a rear end of the side skirt system.

10. The trailer of claim 8, wherein the side skirt system is angled approximately 1.2 degrees relative to the side wall of the trailer.

11. A trailer having a storage container, a landing gear assembly coupled to the storage container, and a rear wheel assembly coupled to the storage container, the trailer comprising:
    a side skirt system for reducing drag on the trailer including a side skirt wall configured to be coupled to one side of the trailer to extend below one side wall of the trailer at least partially along a length of the trailer, wherein a distance between a leg of the landing gear of the trailer and a top, front edge of the side skirt wall is between approximately between 6 and 54 inches, wherein a distance between a rear edge of the side skirt wall and forward-most position of the wheels of the rear wheel assembly is between approximately 54 inches and approximately 102 inches.

12. The trailer of claim 11, wherein the side skirt wall is configured to move laterally outwardly and laterally inwardly with respect to a generally vertical axis parallel to the side wall of the trailer when the trailer is in transit.

13. The trailer of claim 11, wherein the trailer includes a second side skirt system coupled to another side wall of the trailer, wherein the first the side skirt system defines a first front gap between the landing gear of the trailer and a front edge of the side skirt wall of the first side skirt system, wherein the second side skirt system defines a second rear gap between a rear edge of the side skirt wall of the second side skirt system and the forward-most position of the rear wheel assembly, wherein the first and second side skirt systems operate to allow a cross-wind to travel through the first front gap, under the storage container of the trailer, and out through the second rear gap when the trailer is traveling down a highway.

14. The trailer of claim 12, wherein the side skirt system is configured to tilt laterally both inwardly and outwardly relative to the floor assembly of the trailer.

15. The trailer of claim 11, wherein the side skirt wall includes first and second wall panels engaged with and coupled to each other.

16. A method of reducing drag on a trailer comprising:
providing a first side skirt system on the trailer, wherein the first side skirt system includes a first side skirt wall configured to be coupled to a first side of the trailer to extend below a first side wall of the trailer at least partially along a length of the trailer, a first, front gap being provided between a landing gear leg of the trailer and a top, front wall of the first side skirt wall, the first front gap between approximately 6 inches and approximately 54 inches;

providing a second side skirt system on the trailer, wherein the second side skirt system includes a second side skirt wall configured to be coupled to a second side of the trailer to extend below a second side wall of the trailer at least partially along a length of the trailer, a second, rear gap being provided between a rear edge of the second side skirt wall and a forward-most position of a rear wheel of a rear wheel assembly of the trailer, the second, rear gap being between approximate 54 inches and approximately 102 inches; and allowing air to enter an undercarriage region below a floor assembly of the trailer adjacent the first side skirt system and through the first, front gap and allowing the air that entered the undercarriage region to exit the undercarriage region through the second, rear gap adjacent the second side skirt system when the trailer is in transit.

\* \* \* \* \*